May 5, 1936.　　　J. LEDWINKA　　　2,039,727
RAIL CAR WHEEL
Original Filed Oct. 20, 1933
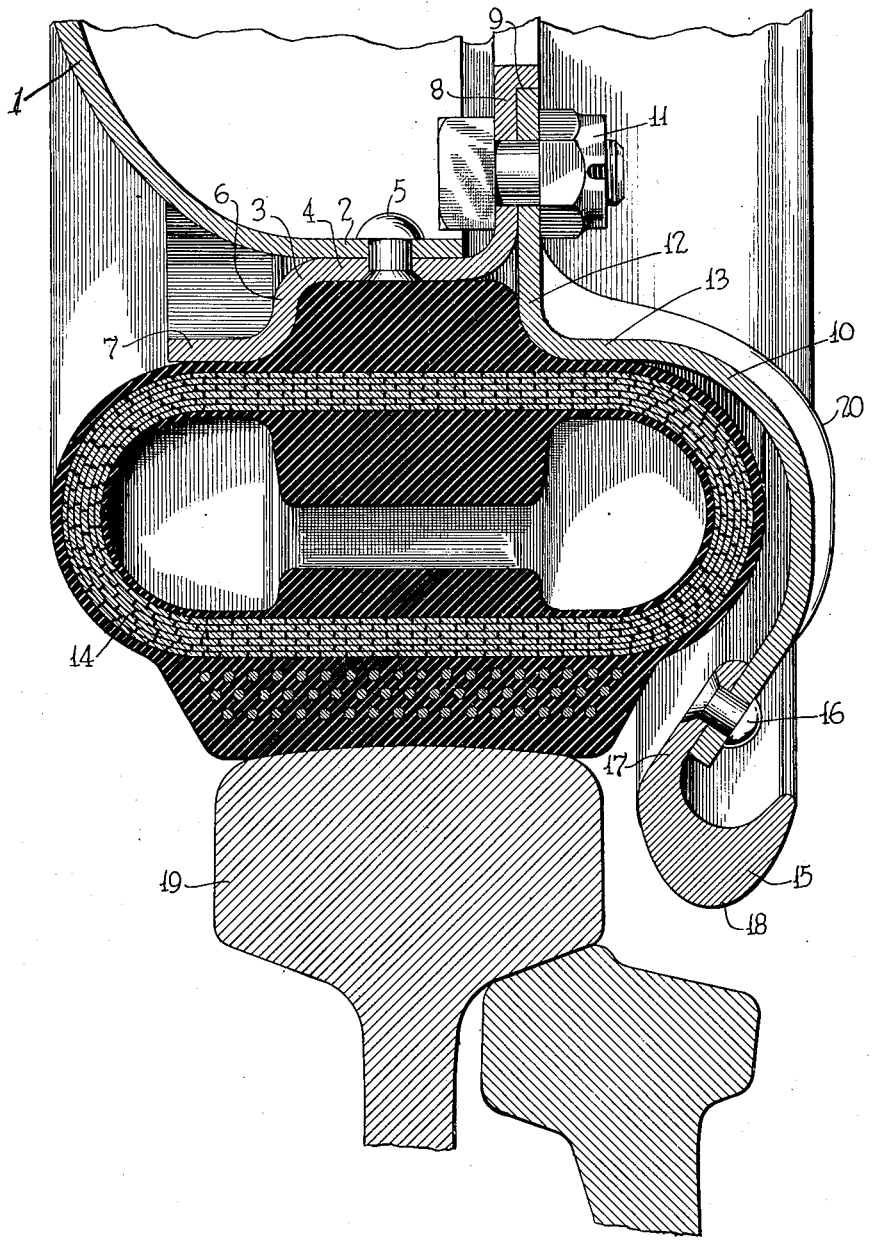
INVENTOR.
JOSEPH LEDWINKA.
BY
John P. Barbot
ATTORNEY.

UNITED STATES PATENT OFFICE 2,039,727

RAIL CAR WHEEL

Joseph Ledwinka, Philadelphia, Pa., assignor to Edward G. Budd Mfg. Co., Philadelphia, Pa., a corporation of Pennsylvania Application October 20, 1933, Serial No. 694,368
Renewed October 19, 1935

3 Claims. (Cl. 295—31)

The present invention relates to rail-car wheels and more specifically to a flanged rail-car wheel capable of carrying a single tube pneumatic tire.

Because of the additional space between the rim of the wheel and the rail, occupied by the pneumatic tire, the flange must be of a much greater radius than that of the usual railway wheel, which increase in radius with consequent increase in weight, together with the higher speed of travel of light rail-cars tends to increase the stresses due to centrifugal force. The object of the present invention, therefore, is to offset to a high degree the difficulties arising from the above mentioned increase of speed and the flange radius. This object is accomplished by the provision of a wheel construction of pressed sheet metal having a minimum number of parts so shaped and proportioned in relation to each other as to give maximum strength, rigidity and wearing qualities, with minimum weight. The above and other objects and advantages of the invention will be more clearly understood upon reference to the following specifications and the drawing accompanying the same.

The invention is illustrated in the accompanying drawing which shows a vertical, axial cross section through the wheel and rail head.

Referring to the drawing in detail, the main wheel body 1 is of disc form with its peripheral margin extended axially inwardly to form a cylindrical rim-mounting 2, extending across the plane of tread of the wheel. Mounted around over this cylindrical extension 2, is the tire rim member 3 having a tire seating portion 4, secured to the extension 2 in suitable manner as by rivets 5.

The rim member 3 is provided with an integral tire retaining side wall 6 which extends further outwardly to form a radially outwardly facing tire seating shoulder 7. The inner side of the rim member 3 is extended radially inwardly to form a relatively wide mounting flange 8 with an axially inwardly extending edge portion forming an angular seat 9 around the inner face of the flange 8.

An annular wheel flange member 10 is removably secured to the mounting flange 8 with its inner marginal portion seated in the angular seat 9. The means for removably securing the wheel flange to the mounting flange may be of any known or suitable type, preferably a bolt and nut assemblage 11. The wheel flange 10 is extended radially outwardly from this point of attachment a short distance beyond the tire seating portion 4 of the rim to form an inner tire retaining side wall 12, and axially inwardly a short distance to form an inner tire seating shoulder portion 13. From this point the rim is extended further along the inner side wall of the tire 14 to approximate the radial depth of the tire tread. To protect the peripheral edge of the wheel flange against wear, it is covered by a separate flange ring 15 secured to the wheel flange by means of a circular series of rivets 16 which secure the ring to the flange through a mounting flange 17 integral with the ring. The flange ring 15 is formed with the usual tapered ridge portion 18 for operating track switches and the like and is so proportioned and arranged with relation to other parts as to have the greater portion of its body material situated below the tire tread and between the wheel flange and side of the rail head 19 when the wheel is positioned in normal alignment with the rail head.

The general sinuous shape of the radial section of the wheel flange and flange ring produces a deep annular ribbing effect which together with the radial inwardly pressed ribs 20 produce a network of multi-directional ribbing adequately reinforcing the wheel flange.

While I have shown and described a specific embodiment of the invention for the purpose of disclosure, it is to be understood that the invention is not limited to such specific embodiment, but contemplates all such variations and modifications as fall fairly within the scope of the appended claims.

What I claim is:

1. A pneumatic tired rail-car wheel comprising a rim member having a tire seating portion and an integral tire-retaining side wall at its outer side, a wheel flange removably secured against the inner side of said rim member and in part forming an inner tire-retaining wall, and a pneumatic tire mounted on said rim, said wheel flange extending around a side of the tire a radial distance substantially equal to that of the tire tread, and a separate flange ring covering the peripheral edge and outer margin of the flange and secured thereto with a portion of its body material interposed between the flange and the inner side of a rail head on which the wheel is positioned in normal alignment, together with a plurality of axially inwardly pressed ribs extending radially outwardly from where the wheel flange is secured to the rim member to near the periphery of the flange.

2. A pneumatic tired rail-car wheel comprising a rim member having a tire seating portion, and at its outer side an integral tire retaining side wall and a radially outwardly facing tire seating shoulder, a radially inwardly extending mounting flange formed on the inner side of the rim member with an axially inwardly extending edge portion forming an annular angle seat, and an annular wheel flange member having its radially inner rim seated in said angle seat and removably secured to the mounting flange, said wheel flange member extending radially outwardly and axially inwardly to form an inner tire retaining side wall and tire seating shoulder, a pneumatic tire mounted on said rim member, said wheel flange member extending radially outwardly around the inner side of the tire to a radial depth sufficient to bring the flange into operative relation with the side of a rail head on which the wheel is supported in normal alignment.

3. A pneumatic tired rail car wheel comprising a tire rim member having a cylindrical tire seating portion extending axially across the plane of tread of the wheel with one side extended radially outwardly then axially outwardly forming a side wall and shoulder and having the axially inner side edge extended radially inwardly then axially inwardly forming a recessed mounting flange, an annular sheet metal wheel flange having its radially inner marginal portion nested in the said recessed mounting flange and bolted thereto, said wheel flange extending radially outwardly along the axially inner side of the tire seating portion of the rim member forming an axially inner side wall for the tire seating portion, and extending axially inwardly forming an inner tire-seating shoulder, then radially outwardly with an inward curve forming a wheel flange, a pneumatic tire mounted on the rim and seated against said tire seating portion and shoulders, said wheel flange being spaced from the side wall of the tire and extended to substantially the radial depth of the tire tread, and a separate flange ring secured to the periphery of the wheel flange and so arranged and proportioned with respect to the tire that its lower portion of the ring will lie in operative relation to the side of a rail head on which the wheel is supported in normal alignment.

JOSEPH LEDWINKA.